(12) United States Patent
Nakamura et al.

(10) Patent No.: US 10,382,159 B2
(45) Date of Patent: Aug. 13, 2019

(54) DUMMY-LIGHT GENERATING DEVICE, OPTICAL TRANSMISSION APPARATUS, AND DUMMY-LIGHT GENERATING METHOD

(71) Applicant: Mitsubishi Electric Corporation, Chiyoda-ku (JP)

(72) Inventors: Seiki Nakamura, Tokyo (JP); Tsuyoshi Yoshida, Tokyo (JP); Keisuke Matsuda, Tokyo (JP); Tatsuya Kobayashi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/569,551

(22) PCT Filed: Apr. 27, 2015

(86) PCT No.: PCT/JP2015/062734
§ 371 (c)(1),
(2) Date: Oct. 26, 2017

(87) PCT Pub. No.: WO2016/174719
PCT Pub. Date: Nov. 3, 2016

(65) Prior Publication Data
US 2018/0309535 A1    Oct. 25, 2018

(51) Int. Cl.
*H04B 10/2507*   (2013.01)
*H04J 14/06*    (2006.01)
(Continued)

(52) U.S. Cl.
CPC ............ *H04J 14/06* (2013.01); *G02F 1/0136* (2013.01); *H04B 10/2507* (2013.01);
(Continued)

(58) Field of Classification Search
CPC ............................ H04J 14/06; G02F 1/0136
See application file for complete search history.

(56) References Cited

U.S. PATENT DOCUMENTS

| 6,735,398 | B1 * | 5/2004 | Izadpanah | H04B 10/504 |
| | | | | 398/183 |
| 6,865,306 | B2 * | 3/2005 | Doi | H04B 10/505 |
| | | | | 385/14 |

(Continued)

FOREIGN PATENT DOCUMENTS

| CN | 102142920 A | 8/2011 |
| CN | 102246448 A | 11/2011 |

(Continued)

OTHER PUBLICATIONS

International Search Report dated Jun. 23, 2015 in PCT/JP2015/062734, filed on Apr. 27, 2015.

(Continued)

*Primary Examiner* — David C Payne
*Assistant Examiner* — Omar S Ismail
(74) *Attorney, Agent, or Firm* — Oblon, McClelland, Maier & Neustadt, L.L.P.

(57) ABSTRACT

A dummy-light generating device includes a continuous wave (CW) light source that outputs CW light, a modulated-light generating unit that generates, using the CW light, first intensity-modulated light subjected to intensity modulation and second intensity-modulated light delayed by a half time of a modulation cycle of the first intensity-modulated light with respect to the first intensity-modulated light and having a polarization state e different from a polarization state e of the first intensity-modulated light, and a polarization combiner that performs polarization combination of the first (Continued)

intensity-modulated light and second intensity-modulated light and outputs light after the polarization combination as dummy light.

10 Claims, 15 Drawing Sheets

(51) Int. Cl.
  H04J 14/00 (2006.01)
  H04J 14/02 (2006.01)
  G02F 1/01 (2006.01)
  H04B 10/294 (2013.01)
  H04B 10/50 (2013.01)
  H04B 10/532 (2013.01)
  H04B 10/54 (2013.01)

(52) U.S. Cl.
  CPC ......... *H04B 10/294* (2013.01); *H04B 10/505* (2013.01); *H04B 10/506* (2013.01); *H04B 10/532* (2013.01); *H04B 10/54* (2013.01); *H04J 14/00* (2013.01); *H04J 14/02* (2013.01); *H04J 14/0221* (2013.01)

(56) References Cited

U.S. PATENT DOCUMENTS

| | | | | |
|---|---|---|---|---|
| 10,122,489 | B2* | 11/2018 | Nakashima | H04B 10/614 |
| 2002/0146190 | A1* | 10/2002 | Doi | G02F 1/2255 385/14 |
| 2003/0007710 | A1* | 1/2003 | Doi | G02F 1/2255 385/2 |
| 2003/0147581 | A1* | 8/2003 | Doi | G02F 1/2255 385/14 |
| 2007/0195396 | A1* | 8/2007 | Hashimoto | G02F 1/2255 359/236 |
| 2010/0080571 | A1 | 4/2010 | Akiyama et al. | |
| 2010/0150559 | A1* | 6/2010 | Essiambre | H04J 14/06 398/79 |
| 2011/0170869 | A1 | 7/2011 | Mandai et al. | |
| 2011/0274436 | A1* | 11/2011 | McNicol | H04B 10/5561 398/140 |
| 2012/0251129 | A1* | 10/2012 | Delfyett | H01S 5/0656 398/188 |
| 2013/0011093 | A1* | 1/2013 | Goh | G02F 1/0121 385/3 |
| 2014/0348506 | A1* | 11/2014 | Nakamoto | H04J 14/0224 398/65 |
| 2015/0229406 | A1 | 8/2015 | Akiyama et al. | |
| 2015/0244466 | A1* | 8/2015 | Okamoto | H04B 10/27 398/140 |
| 2017/0188420 | A1* | 6/2017 | Kido | H04B 10/116 |

FOREIGN PATENT DOCUMENTS

| | | |
|---|---|---|
| JP | 2000-228649 A | 8/2000 |
| JP | 2010-081287 A | 4/2010 |
| JP | 2012-511875 A | 5/2012 |
| JP | 2012-109653 A | 6/2012 |
| JP | 2014-230042 A | 12/2014 |

OTHER PUBLICATIONS

Office Action dated May 29, 2018 in Japanese Patent Application No. 2017-515307 (with English language translation).

Office Action issued Jul. 3, 2019 in Chinese Patent Application No., 201580079153.2, citing documents AO-AP therein, with English-language translation, 14 pages.

* cited by examiner

DUMMY-LIGHT GENERATING DEVICE, OPTICAL TRANSMISSION APPARATUS, AND DUMMY-LIGHT GENERATING METHOD

FIELD

The present invention relates to a dummy-light generating device, an optical transmission apparatus, and a dummy-light generating method in an optical transmission system.

BACKGROUND

In optical communication, as large-capacity information communication means, a WDM (Wavelength Division Multiplex) scheme for causing wavelength multiplexed light obtained by multiplexing a plurality of lights having different wavelengths to pass through a transmission line formed by an optical fiber and an optical component and transmitting the wavelength multiplexed light is widely used. An optical transmission system adopting the WDM scheme usually includes an optical amplifier that amplifies the wavelength multiplexed light.

In particularly, a submarine optical cable system used in international communication and the like includes, in each relay section of approximately 50 to 100 kilometers, a submarine relay device including an optical amplifier. At initial introduction time of the optical transmission system, in some case, a part of wavelengths in a wavelength band amplified by the optical amplifier, that is, an amplification band of the optical amplifier are used for transmission of signal light and the other wavelengths are not used. In this case, in the optical amplifier designed under an assumption that wavelength multiplexed light obtained by multiplexing signals in all wavelength bands of the amplification band is amplified, optical power per wavelength band of the wavelength multiplexed light is excessive. Such excessive optical power causes a nonlinear optical effect in a transmission line and deteriorates transmission quality of the wavelength multiplexed light.

Therefore, dummy light not having a signal component is sometimes included in a wavelength band not used for transmission of signal light in the wavelength multiplexed light propagated in the transmission line. It is possible to obtain a desired transmission characteristic from the initial introduction time of the optical transmission system by transmitting, using the dummy light, the wavelength multiplexed light obtained by multiplexing signal lights in all wavelength bands of the amplification band of the optical amplifier. A method of using CW (Continuous Wave) light as the dummy light or a method of using ASE (Amplified Spontaneous Emission) light as the dummy light has been proposed. See, for example, Patent Literature 1.

CITATION LIST

Patent Literature

Patent Literature 1: Japanese Patent Application Laid-Open No. 2012-109653

SUMMARY

Technical Problem

However, because the CW light has only a single polarization state, when the CW light is used as the dummy light, a polarization dependency loss or a polarization dependency gain is given. The polarization dependency loss is a loss that occurs according to a polarization state in a transmission line. The polarization state is defined by, for example, relative amplitude and a phase of an electric field vector of light. The polarization dependency gain is a gain corresponding to a polarization state that occurs because a gain at optical amplification time is different according to the polarization state. In the polarization dependency loss or gain, temporal fluctuation depending on a combination of polarization states between the signal light and the dummy light included in the wavelength multiplexed light occurs, leading to deterioration in transmission quality of the signal light.

When a polarization state indicating a vibrating direction of the CW light used as the dummy line fluctuates, further deterioration in the transmission quality occurs because of occurrence of a nonlinear effect such as cross phase modulation (XPM).

On the other hand, the ASE light is non-polarized light and has less polarization state dependency. Temporal fluctuation of the ASE light is small compared with the temporal fluctuation of the CW light. However, because the amplitude of the ASE light changes at random, when the ASE light is used as the dummy light, the transmission quality is deteriorated because signal light adjacent to the dummy light is steadily affected by the fluctuation of the ASE light.

The present invention has been devised in view of the above, and an object of the present invention is to obtain a dummy-light generating device that can generate dummy light with reduced deterioration in transmission quality of signal light.

Solution to Problem

To solve the problems and achieve the object, a dummy-light generating device according to the present invention includes: a light source to output continuous light; and a modulated-light generating unit to generate, using the continuous light, first intensity-modulated light subjected to intensity modulation and second intensity-modulated light delayed by a half time of a modulation cycle of the first intensity-modulated light with respect to the first intensity-modulated light and having a polarization state different from a polarization state of the first intensity-modulated light. The dummy-light generating device includes a polarization combiner to perform polarization combination of the first intensity-modulated light and second intensity-modulated light and output light after the polarization combination as dummy light.

Advantageous Effects of Invention

According to the present invention, there is an effect that it is possible to generate dummy light with reduced deterioration in transmission quality of signal light.

DESCRIPTION OF EMBODIMENTS

Dummy-light generating devices, optical transmission apparatuses, and dummy-light generating methods according to embodiments of the present invention are explained in detail below with reference to the drawings. Note that the present invention is not limited by the embodiments.

First Embodiment

Figure 1:
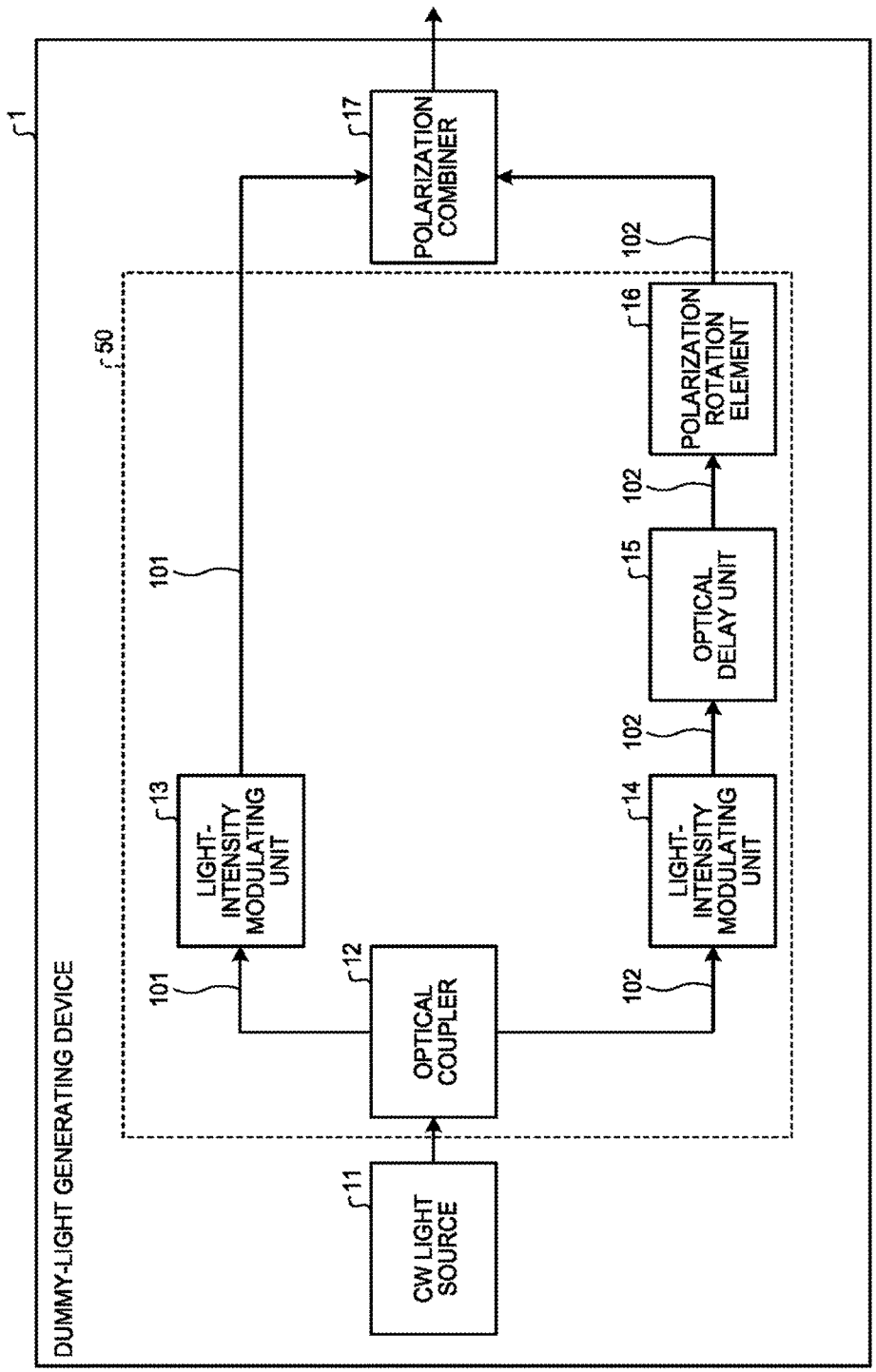
FIG. 1 is a diagram showing a configuration example of a dummy-light generating device according to a first embodiment.

FIG. 1 is a diagram showing a configuration example of a dummy-light generating device according to a first embodiment of the present invention. As shown in FIG. 1, a dummy-light generating device 1 in this embodiment includes a CW light source 11, an optical coupler 12, light-intensity modulating units 13 and 14, an optical delay unit 15, a polarization rotation element 16, and a polarization combiner 17.

The CW light source 11 is a light source that, to generate dummy light in a desired wavelength band, outputs continuous light having a wavelength in the desired wavelength band as a center wavelength. A frequency corresponding to a center wavelength of CW light is referred to as first frequency as appropriate. CW light output by the CW light source 11 has a single polarization state. The polarization state of the CW light output by the CW light source 11 does not have to be completely single. Optical power, that is, the light intensity of the CW light is, for example, approximately several milliwatts to several ten milliwatts. As the CW light source 11, for example, a semiconductor laser (LD: Laser Diode) that oscillates at a single center wavelength can be used. As a wavelength band of the center wavelength, in general, a 1550 nm band, that is, a C band or a 1580 nm band, that is, an L band is mainly used. An optical spectral line width is approximately 100 kilohertz to 100 megahertz. For example, the CW light source 11 is configured by a semiconductor laser configured from a quaternary mixed crystal semiconductor material such as InGaAsP (Indium Gallium Arsenide Phosphide) or InGaAlAs (Indium Gallium Aluminum Arsenide) and a driving circuit of the semiconductor laser. The CW light emitted by the CW light source 11 is output through an optical fiber cable. The CW light source 11 can be integrated on the same substrate as a substrate for other functional elements. Specific hardware used as the CW light source 11, a center wavelength, an optical spectral line width, and the like of the CW light are not limited to the example described above.

The optical coupler 12 divides the CW light output from the CS light source 11 into two continuous lights, that is, first continuous light and second continuous light respectively input to two optical paths. A first optical path 101 and a second optical path 102, which are the two optical paths are formed by an optical fiber cable. The first optical path 101 and the second optical path 102 can be optical paths formed on a substrate such as a quartz glass substrate. The optical coupler 12 is hardware that divides or combines input light and outputs the light. As the optical coupler 12, for example, an optical waveguide-type splitter that divides or combines light using the optical paths formed on the quartz glass substrate can be used. An optical fiber coupler formed by melting and joining a plurality of optical fibers and fusing and extending the optical fibers and having a division ratio determined by a combination length can be used as the optical coupler 12. The optical coupler 12 is a passive device for which a power supply is unnecessary. The optical coupler 12 can be integrated on the same substrate as the substrate for the other functional elements.

Specific hardware used as the optical coupler 12 is not limited to the example described above.

One of the two CW lights divided by the optical coupler 12 is input to the light-intensity modulating unit 13. The other is input to the light-intensity modulating unit 14. The light-intensity modulating units 13 and 14 respectively perform intensity modulation of the input CW lights at the same modulation frequency to generate intensity-modulated lights and respectively output the intensity-modulated lights. As the intensity modulation, modulation for generating sine wave-like modulated light, RZ (Return-to-Zero) modulation, or the like can be used. In the following explanation, an operation frequency of the modulation of the light-intensity modulating units 13 and 14, that is, an inverse of a modulation cycle, which is a cycle of the modulation, is referred to as modulation frequency.

Figure 2:
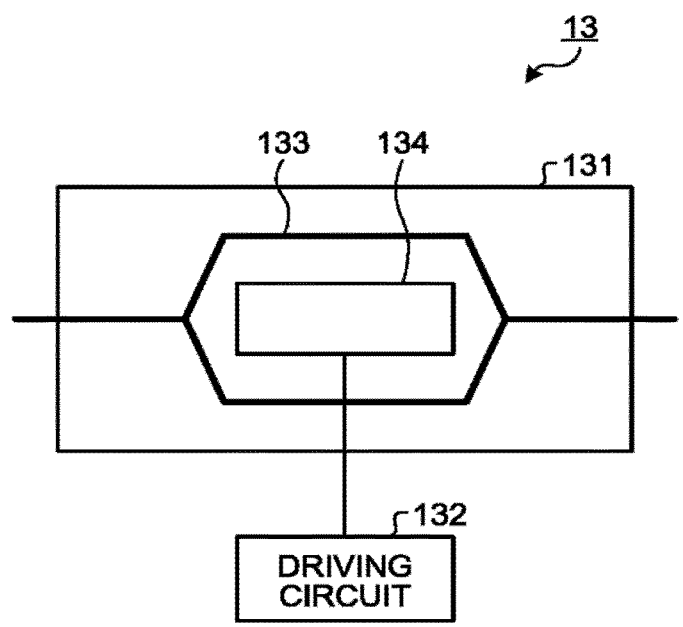
FIG. 2 is a diagram showing a configuration example of a light-intensity modulating unit in the case in which an LN optical modulator in the first embodiment is used.

The light-intensity modulating units 13 and 14 are configured by a light intensity modulator and a driving circuit. As the light intensity modulator, for example, an LN optical modulator including a Mach-Zehnder (MZ) optical waveguide and a modulation electrode formed on a lithium niobate (LiNbO3; LN) substrate can be used. FIG. 2 is a diagram showing a configuration example of the light-intensity modulating unit in the case in which the LN optical modulator is used. The configuration of the light-intensity modulating unit 14 is the same as the configuration of the light-intensity modulating unit 13. As shown in FIG. 2, the light-intensity modulating unit 13 includes a light intensity modulator 131, which is the LN optical modulator, and a driving circuit 132. The light intensity modulator 131 includes an optical waveguide 133 and an electrode 134. When the light intensity modulator 131, which is the LN optical modulator, is used as the light-intensity modulating units 13 and 14, a single or a plurality of driving voltages are applied to the electrode 134 from the driving circuit 132, whereby the light-intensity modulating unit 13 modulates and outputs light input to the light intensity modulator 131. Note that FIG. 2 shows a functional configuration diagram of the light-intensity modulating unit 13 and does not show an actual shape. The configuration example shown in FIG. 2 is an example. The configuration of the light-intensity modulating unit 13 is not limited to the example shown in FIG. 2. The light-intensity modulating units 13 and 14 can be integrated on the same substrate as the substrate for the other functional elements. Specific hardware used as the light-intensity modulating units 13 and 14 is not limited to the example described above.

The light intensity modulator 131 in the light-intensity modulating unit 13 is a first intensity modulator that performs intensity modulation of the first continuous light to generate first intensity-modulated light. The light intensity modulator 131 in the light-intensity modulating unit 14 is a second intensity modulator that performs intensity modulation of the second continuous light using an inverse of the second frequency as a modulation cycle, that is, at the same modulation cycle as a modulation cycle of the first intensity-modulated light to generate intensity-modulated light.

The optical delay unit 15 delays the intensity-modulated light output from the light-intensity modulating unit 14, that is, the intensity-modulated light generated by the second intensity modulator by a half time of the modulation cycle of the first intensity-modulated light. For this reason, the intensity-modulated light output from the optical delay unit 15 and the intensity-modulated light output from the light-intensity modulating unit 13 are intensity-modulated lights having phases different by 180°, that is, intensity-modulated lights having opposite phases. As the optical delay unit 15, when the first optical path 101 and the second optical path 102 are formed by optical fibers, for example, an additional optical fiber cable, the length of which is adjusted to delay the intensity-modulated light by a half of the modulation cycle, can be used. When the first optical path 101 and the second optical path 102 are optical paths formed on a substrate such as a quartz glass substrate, as the optical delay unit 15, an additional optical path formed on a substrate, the length of which is adjusted to delay the intensity-modulated light by a half of the modulation cycle, can be used. In this way, the optical delay unit 15 can be realized by the additional optical path, that is, an optical delay extension line. In the example in which the optical delay line is used, a delay is given by a propagation time. However, not only this, but, for example, a relative delay can be given to the light-intensity modulating unit 13 or the light-intensity modulating unit 14 by providing a time difference with respect to driving voltages of the light-intensity modulating units 13 and 14. In this case, the driving circuits of the light-intensity modulating units 13 and 14 have the function of the optical delay unit.

The polarization rotation element 16 rotates, by 90°, a polarization state of the intensity-modulated light delayed by the optical delay unit 15 to output second intensity-modulated light, which is intensity-modulated light polarized and orthogonal to the first intensity-modulated light, which is the intensity-modulated light output from the intensity modulating unit 13. Note that an angle at which the polarization rotation element 16 rotates the polarization state does not have to be 90°. When the angle at which the polarization rotation element 16 rotates the polarization state is 90°, an effect of 90° is obtained because the first intensity-modulated light and the second intensity-modulated light before polarization combination are orthogonal and, ideally, power of dummy light subjected to the polarization combination is temporally fixed. As the polarization rotation element 16, for example, a half wavelength plate (a ½ wavelength plate) by a birefringent medium can be used. The polarization rotation element 16 can be integrated on the same substrate as the substrate for the other functional elements. Specific hardware used as the polarization rotation element 16 is not limited to the example described above.

The optical coupler 12, the light-intensity modulating units 13 and 14, the optical delay unit 15, and the polarization rotation element 16 in this embodiment configure a modulated-light generating unit 50 that generates, using the CW light output from the CW light source 11, the first intensity-modulated light subjected to the intensity modulation and the second intensity-modulated light, which is delayed by a half time of the modulation cycle of the first intensity-modulated light with respect to the first intensity-modulated light and a polarization state of which is different from the polarization state of the first intensity-modulated light. In this embodiment, the first intensity-modulated light is intensity-modulated light input to the polarization combiner 17 via the first optical path 101. The second intensity-modulated light is intensity-modulated light input to the polarization combiner 17 via the second optical path 102.

The polarization combiner 17 combines the intensify modulated light input from the light-intensity modulating unit 13 and the intensity-modulated light output from the light-intensity modulating unit 14 and input through the optical delay unit 15 and the polarization rotation element 16 and outputs combined light as dummy light. That is, the polarization combiner 17 performs polarization combination of the first intensity-modulated light and the second intensity-modulated light and outputs light after the polarization combination as dummy light. Note that the polarization combination indicates that lights on the single polarization state are combined. As the polarization combiner 17, for example, a polarization combiner in which optical crystal is used can be used. The polarization combiner 17 can be integrated on the same substrate as the substrate for the other functional elements.

Figure 3:
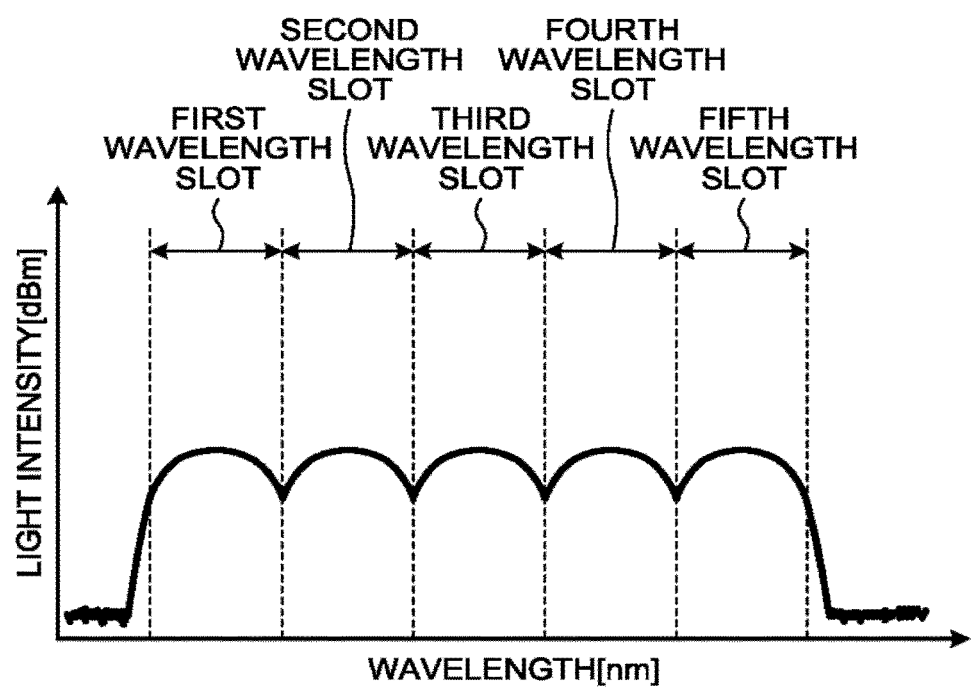
FIG. 3 is a diagram showing an example of a spectrum and an example of wavelength slots of wavelength multiplexed light transmitting by an optical transmission system in the first embodiment.

The dummy-light generating device 1 in this embodiment is mounted on, for example, an optical transmission apparatus in an optical transmission system that transmits wavelength multiplexed light. Lights having light wavelengths in each of wavelength slots, that is, each of wavelength bands are multiplexed on the wavelength multiplexed light transmitted by the optical transmission system. FIG. 3 is a diagram showing an example of a spectrum and an example of wavelength slots of the wavelength multiplexed light transmitted by the optical transmission system. In the example shown in FIG. 3, five wavelength slots of a first wavelength slot to a fifth wavelength slot are used. When it is possible to use the five wavelength slots shown in FIG. 3, the optical transmission apparatus of the optical transmission system amplifies lights in the five wavelength slots.

Figure 4:
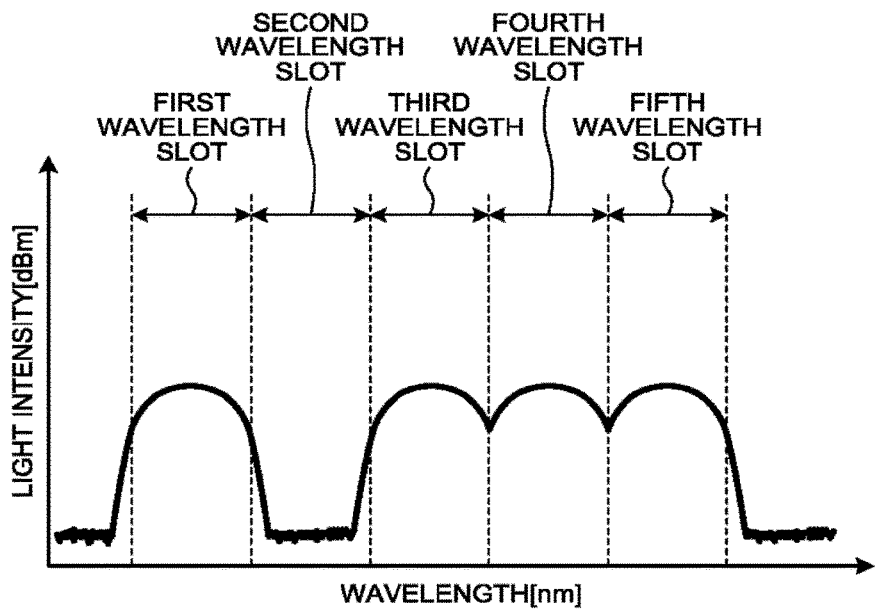
FIG. 4 is a diagram showing another example of the spectrum of the wavelength multiplexed light transmitted by the optical transmission system in the first embodiment.

However, signal light in a part of the wavelength slots is sometimes not included in wavelength multiplexed light, for example, in the beginning of operation of the optical transmission system. FIG. 4 is a diagram showing another example of the spectrum of the wavelength multiplexed light transmitted by the optical transmission system. In FIG. 4, signal light in the second wavelength slot among the five wavelength slots explained above is not included in the wavelength multiplexed light.

In general, the optical transmission apparatus amplifies wavelength multiplexed light such that wavelength multiplexed light after the amplification has desired light intensity. The wavelength multiplexed light to be amplified is a signal in a time domain and is a signal in which the spectrum shown in FIG. 3, FIG. 4, or the like is converted into the time domain. A peak value of the signal in the time domain increases as wavelength bands multiplexed on the wavelength multiplexed light increase. For this reason, when the amplification is carried out such that the wavelength multiplexed light after the amplification has the desired light intensity on the premise that the wavelength multiplexed light including the signal lights in the five wavelength slots as shown in FIG. 3 is input, as shown in FIG. 4, if the wavelength multiplexed light not including the signal light in a part of the wavelength slots is amplified in the optical transmission apparatus, light intensity in the wavelength slots including the signal lights are excessively amplified. In the example shown in FIG. 4, light intensities of the signal lights in the first wavelength slot and the third wavelength slot to the fifth wavelength slot are excessively amplified. The excessive amplification causes a nonlinear optical effect in a transmission line and deteriorates transmission quality of the wavelength multiplexed light.

For this reason, the optical transmission system generates dummy light having a wavelength within a wavelength slot not including signal light and multiplexes the dummy light on the wavelength multiplexed light. As explained above, the dummy-light generating device 1 in this embodiment generates the dummy light multiplexed on the wavelength multiplexed light as light in the wavelength slot not including signal light.

Figure 5:
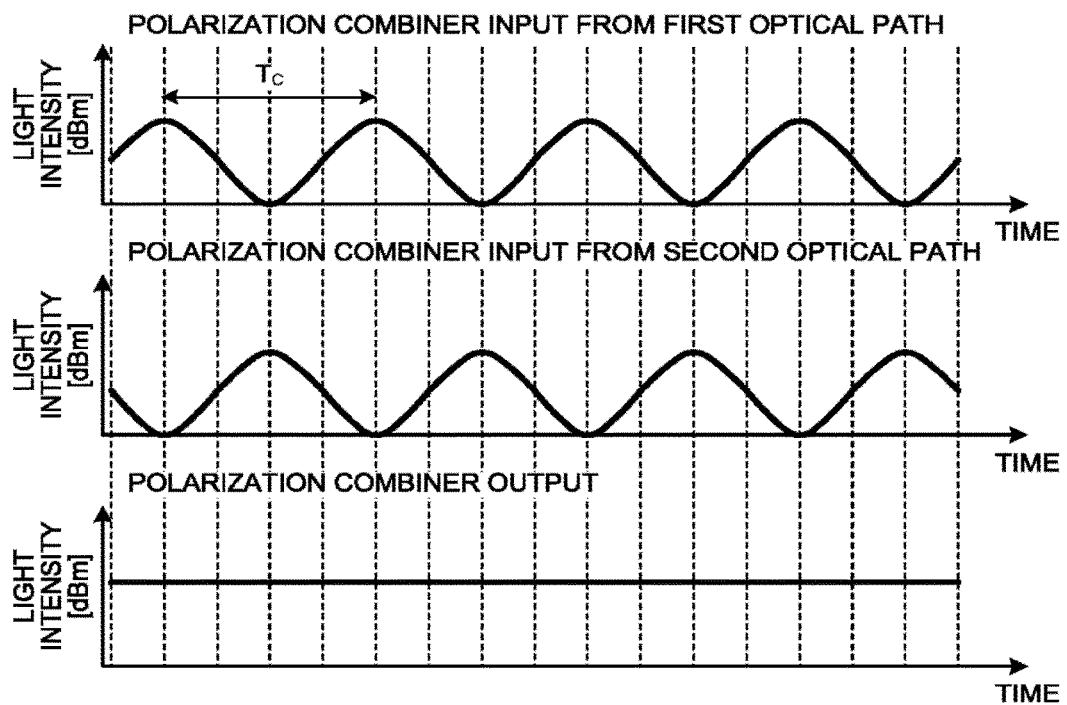
FIG. 5 is a diagram showing an example of the light intensity of dummy light in the first embodiment.

Dummy light generated by the dummy-light generating device 1 in this embodiment is explained. FIG. 5 is a diagram showing an example of the light intensity of dummy light in this embodiment. A modulation cycle Tc in FIG. 5 is an inverse of a modulation frequency. In a first stage of FIG. 5, the light intensity of intensity-modulated light input to the polarization combiner 17 through the first optical path 101 is shown. In a second stage of FIG. 5, the light intensity of intensity-modulated light input to the polarization combiner 17 through the second optical path 102 is shown. In a third stage of FIG. 5, the light intensity of dummy light output from the polarization combiner 17 is shown. In FIG. 5, an example is shown in which the light-intensity modulating units 13 and 14 perform modulation for generating sine wave-like intensity-modulated light. In this case, both of the light-intensity modulating units 13 and 14 generate the sine wave-like intensity-modulated light as shown in the first stage. The intensity-modulated light subjected to intensity modulation by the light-intensity modulating unit 14 is delayed by a half cycle of a modulation cycle by the optical delay unit 15 to be intensity-modulated light opposite in phase to the intensity-modulated light output from the light-intensity modulating unit 13.

The polarization combiner 17 combines the intensity-modulated light input through the first optical path 101 and the intensity-modulated light input through the second optical path 102. Therefore, the light intensity of the dummy light output from the polarization combiner 17 is fixed. Note that the light intensity does not have to be completely fixed and only has to be substantially fixed. A polarization state of the intensity-modulated light input through the second optical path 102 and a polarization state of the intensity-modulated light input through the first optical path 101 are different. Therefore, the dummy-light generating device 1 in this embodiment can generate dummy light, the light intensity of which is fixed and which is not a single polarized wave.

Figure 6:
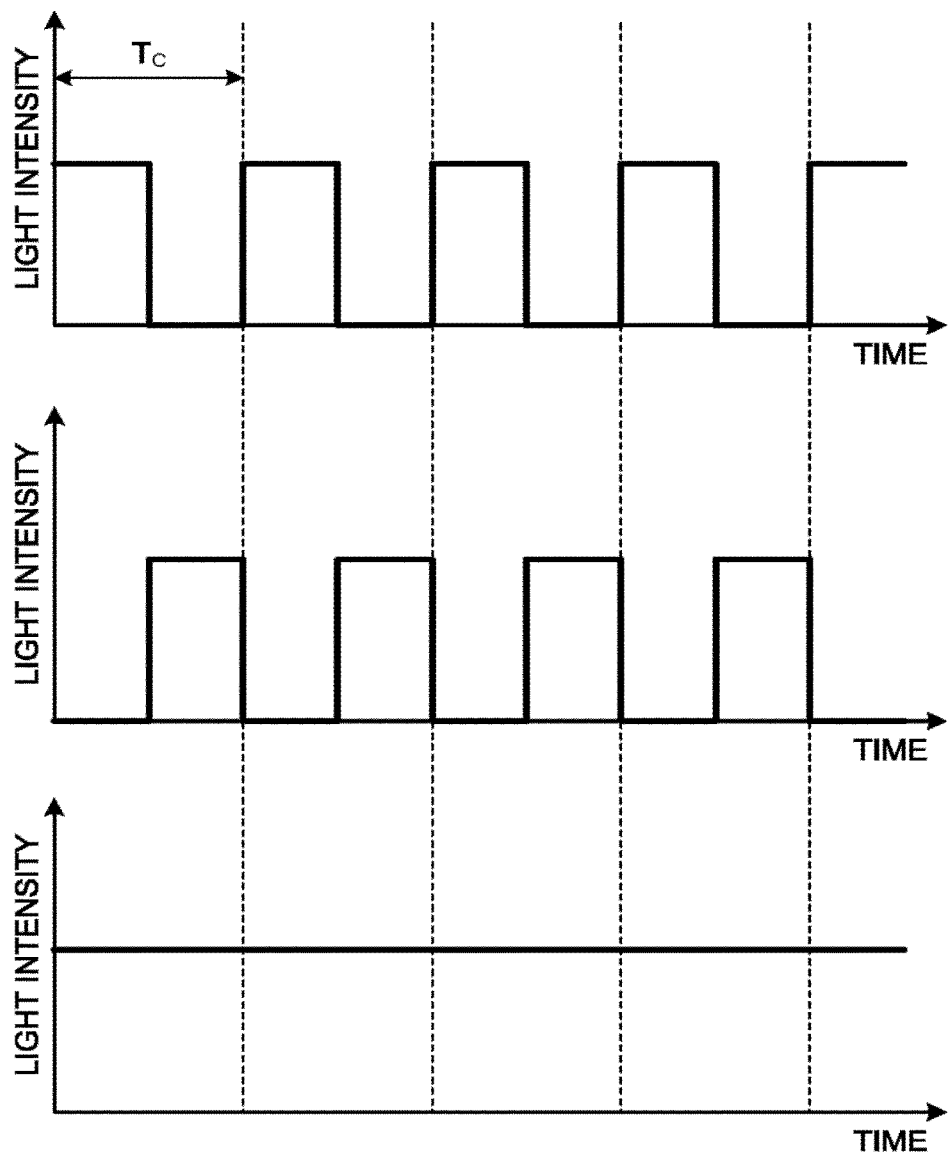
FIG. 6 is a diagram showing another example of the light intensity of the dummy light in the first embodiment.

FIG. 6 is a diagram showing another example of the light intensity of the dummy light in this embodiment. The modulation cycle Tc in FIG. 6 is an inverse of a modulation frequency. In a first stage of FIG. 6, the light intensity of intensity-modulated light input to the polarization combiner 17 through the first optical path 101 is shown. In a second stage of FIG. 6, the light intensity of intensity-modulated light input to the polarization combiner 17 through the second optical path 102 is shown. In a third stage of FIG. 6, the light intensity of dummy light output from the polarization combiner 17 is shown. In FIG. 6, an example is shown in which the light-intensity modulating units 13 and 14 perform RZ (Return to Zero) modulation. Both of the light-intensity modulating units 13 and 14 generate intensity-modulated light subjected to the RZ modulation as shown in the first stage. Note that it is assumed that all of information data in the RZ modulation are 1 as shown in FIG. 6. The RZ modulation is a scheme for performing modulation such that the information data is a value corresponding to a data value in the former half in one cycle and is 0 in the latter half in the one cycle. As in the example shown in FIG. 5, the intensity-modulated light subjected to the intensity modulation by the light-intensity modulating unit 14 is delayed by a half cycle of a modulation cycle by the optical delay unit 15 to be intensity-modulated light opposite in phase to the intensity-modulated light output from the light-intensity modulating unit 13.

The polarization combiner 17 combines the intensity-modulated light input through the first optical path 101 and the intensity-modulated light input through the second optical path 102. Therefore, the light intensity of the dummy light output from the polarization combiner 17 is substantially fixed. A polarization state of the intensity-modulated light input through the second optical path 102 and a polarization state of the intensity-modulated light input through the first optical path 101 are different. Therefore, as in the example shown in FIG. 5, in the example shown in FIG. 6, the dummy-light generating device 1 in this embodiment can generate dummy light, the light intensity of which is substantially fixed and which is not a single polarized wave.

A method of the intensity modulation for generating dummy light is not limited to the examples explained above. The intensity-modulated light input to the polarization combiner 17 through the first optical path 101 and the intensity-modulated light input to the polarization combiner 17 through the second optical path 102 only have to be signals in opposite phases.

Figure 7:
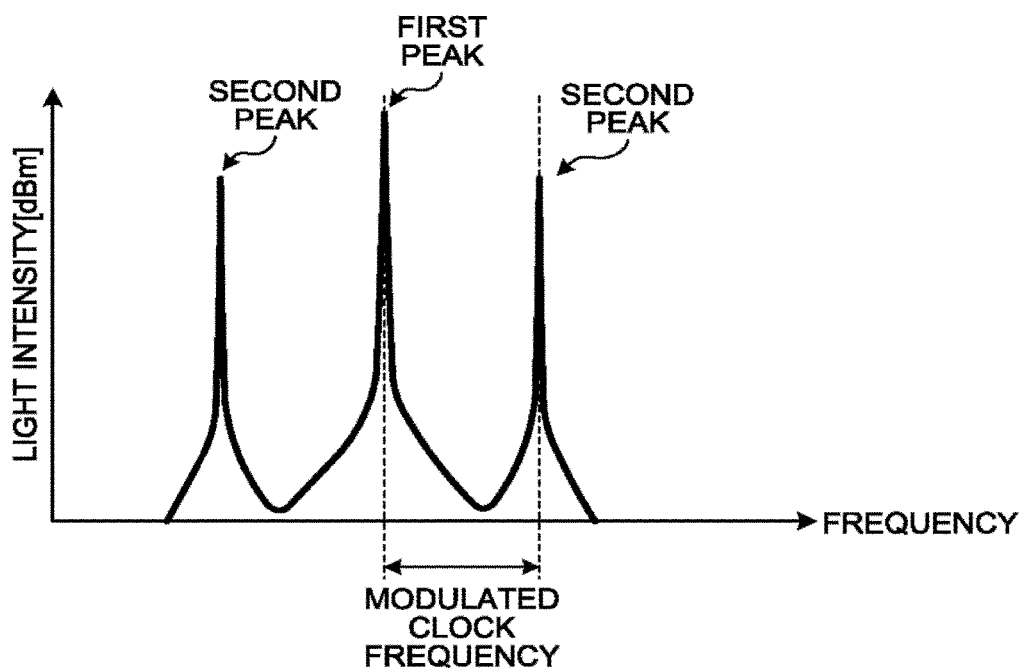
FIG. 7 is a diagram showing an example of a spectrum of the dummy light in the first embodiment.

FIG. 7 is a diagram showing an example of a spectrum of the dummy light in this embodiment. As shown in FIG. 7, the spectrum of the dummy light in this embodiment has a first peak in a center frequency, which is a frequency corresponding to a center wavelength of a spectrum of CW light emitted from the CW light source 11, and has two second peaks in frequencies apart from the first peak by a modulation frequency to both sides of the first peak. That is, the spectrum of the dummy light has the first peak in a first frequency and has the second peaks in a frequency higher than the first frequency by a second frequency and a frequency lower than the first frequency by the second frequency. This is because, because the CW light output from the CW light source 11 is modulated at the modulation frequency, a component having a cycle, which is an inverse of the modulation frequency, is multiplied with the CW light output from the CW light source 11 and a both-side spectrum appears through convolution in a frequency domain.

Note that the modulation frequency can be, for example, a frequency higher than a half of a band width of the spectrum of the CW light output from the CW light source 11, that is, a frequency range to a region where a gain is attenuated by 3 decibels from the center frequency of the spectrum of the CW light output from the CW light source 11. That is, the modulation frequency, which is the second frequency, can be a frequency higher than a half of the band width of the spectrum of the CW light centering on the first frequency, which is the center frequency of the spectrum of the CW light. In this case, in the spectrum of the dummy light shown in FIG. 7, a band centering on the first peak and spreads centering on the second peaks on both the sides can be distinguished. When the modulation frequency is lower than the band width of the spectrum of the CW light output from the CW light source 11, the same polarization state temporally continues. Therefore, it is likely that signal quality of an adjacent signal light is disturbed. However, it is possible to suppress the disturbance affecting the signal quality of the adjacent signal light by setting the modulation frequency larger than the band width of the spectrum of the CW light output from the CW light source 11.

When the dummy light generated by the dummy-light generating device 1 in this embodiment is subjected to wavelength multiplexing with a signal wave, the modulation frequency can be set to a frequency lower than a symbol rate of signal light, that is, a modulation frequency at the time when the signal light is modulated. When the modulation frequency is set to a frequency equal to or lower than the symbol rate of the signal light, it is possible to suppress a change in a waveform of the dummy light due to wavelength dispersion in a transmission line. It is possible to suppress signal quality deterioration.

Figure 8:
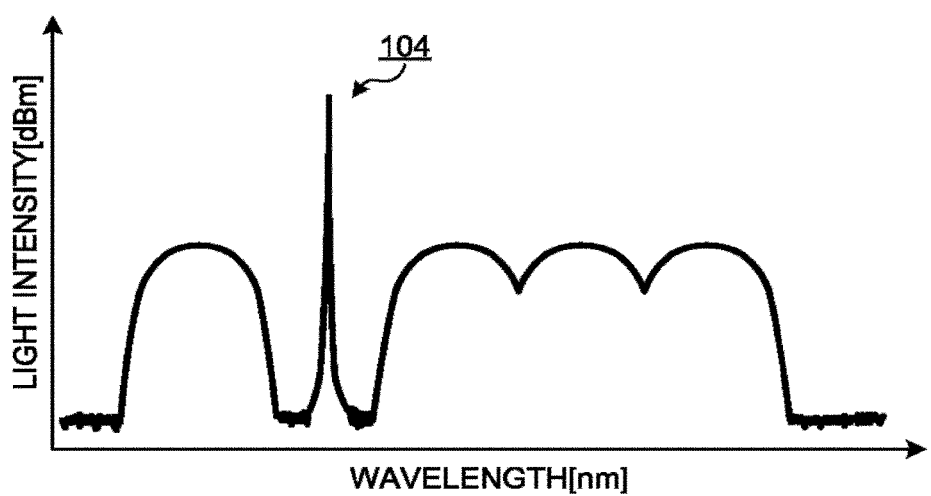
FIG. 8 is a diagram showing an example of a spectrum of wavelength multiplexed light in the case in which CW light is used as the dummy light.
Figure 9:
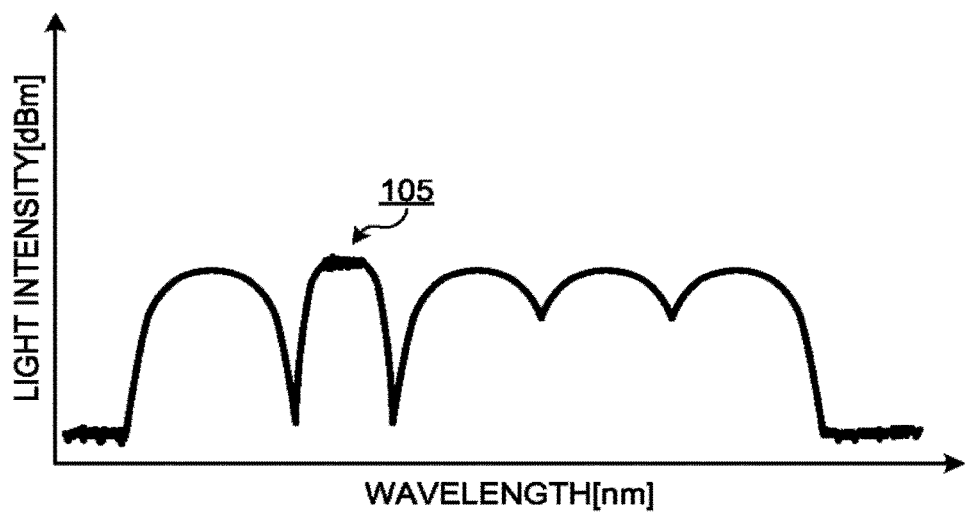
FIG. 9 is a diagram showing an example of a spectrum of wavelength multiplexed light in the case in which ASE light is used as the dummy light.

An effect in this embodiment is explained. To explain the effect of this embodiment, an example in which CW light is used as dummy light is explained and an example in which ASE light is used as dummy light is explained as a comparative example. FIG. 8 is a diagram showing an example of a spectrum of wavelength multiplexed light in the case in which the CW light is used as the dummy light. FIG. 9 is a diagram showing an example of a spectrum of wavelength multiplexed light in the case in which the ASE light is used as the dummy light. A dummy light spectrum 104 shown in FIG. 8 is a spectrum of the CW light. A dummy light spectrum 105 shown in FIG. 9 is a spectrum of the ASE light. In FIGS. 8 and 9, an example is shown in which signal light is not included in the second wavelength slot and signal lights are included in the first wavelength slot and the third to fifth wavelength slots as explained with reference to FIG. 4.

When the CW light is used as the dummy light, because a polarization state is single, a polarization dependency loss or a polarization dependency gain is given. Consequently, transmission quality of signal light is deteriorated. On the other hand, when the ASE light is used as the dummy light, because the ASE light is not a single polarized light, such a problem does not occur. However, amplitude fluctuates and an interference component to signal light in an adjacent wavelength slot, that is, an adjacent signal changes and affects the adjacent signal. Therefore, when the ASE light is used as the dummy light, transmission quality of signal light is also deteriorated.

Figure 10:
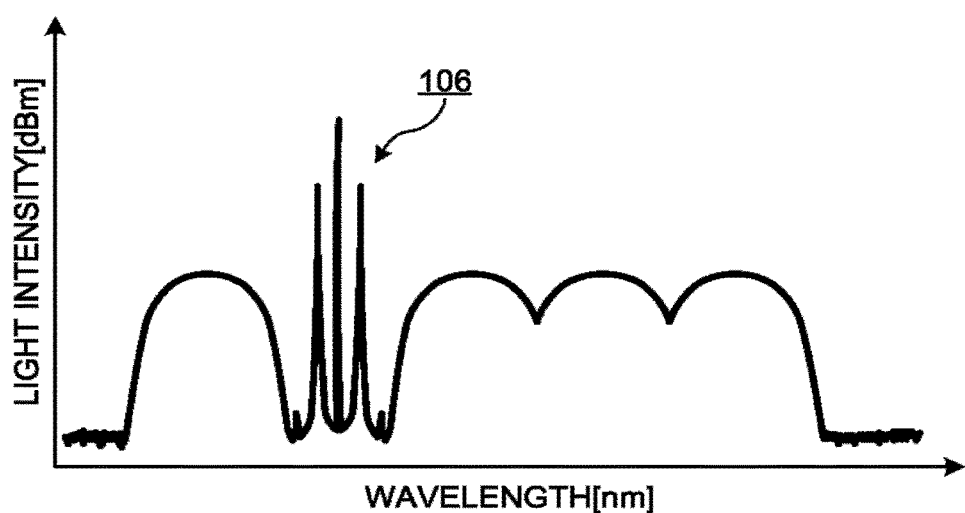
FIG. 10 is a diagram showing an example of a spectrum of wavelength multiplexed light in the case in which the dummy light in the first embodiment is used.

FIG. 10 is a diagram showing an example of a spectrum of wavelength multiplexed light in the case in which the dummy light in this embodiment is used. A dummy light spectrum 106 shown in FIG. 10 is a spectrum of dummy light generated by the dummy-light generating device 1 in this embodiment explained above. In FIG. 10, an example is shown in which signal light is not included in the second wavelength slot and signal lights are included in the first wavelength slot and the third to fifth wavelength slots as explained with reference to FIG. 4.

Figure 11:
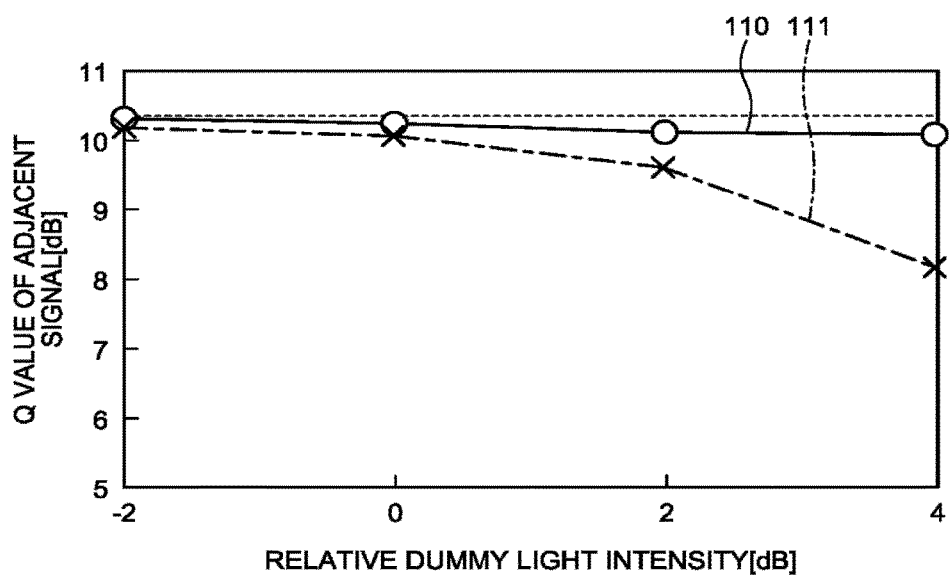
FIG. 11 is a diagram showing an example of a Q value in the case in which the dummy light in the first embodiment is used.

FIG. 11 is a diagram showing an example of a Q value, which is an indicator indicating the quality of a signal, in the case in which the dummy light in this embodiment is used. In FIG. 11, a calculation result 110 indicates an example of a calculation result of a Q value of an adjacent signal, which is signal light adjacent to the dummy light, in the case in which the dummy light in this embodiment is used. A calculation result 111 indicates a Q value of the adjacent signal in the case in which ASE light is used as the dummy light, which is a comparative example. In FIG. 11, an example is shown in which the dummy light shown in FIG. 5 is used as the dummy light in this embodiment. In FIG. 11, an example is shown in which a Q value after dispersion management transmission line 2965 km transmission in a 100G-DP-QPSK signal in the third wavelength slot is calculated by a simulation. The simulation is performed under conditions that the 100G-DP-QPSK signal is disposed in the first wavelength slot and the third wavelength slot to the fifth wavelength slot, the dummy light in this embodiment or the ASE light is disposed in the second wavelength slot, a symbol rate of signal light is 32 GSymbol/s, and a modulation frequency of the dummy light in this embodiment is 12 gigahertz. Note that the conditions of the simulation are examples. Parameters in the optical transmission system in this embodiment are not limited to the examples. In FIG. 11, the horizontal axis indicates relative dummy light intensity, that is, a ratio of the light intensity of the dummy light to the light intensity of signal light. In FIG. 11, the vertical axis indicates a Q value. As shown in FIG. 11, it is seen that, when the dummy light in this embodiment is used, the Q value is high and deterioration of the signal light is less compared with when the ASE light is used as the dummy light.

As explained above, in this embodiment, two intensity-modulated lights having different polarization states each other and in opposite phases each other are generated. The intensity-modulated lights are combined to generate dummy light. For this reason, it is possible to generate dummy light, which is not a single polarized wave and the light intensity of which is fixed. Consequently, it is possible to suppress deterioration in transmission quality of the signal light. When cyclically changed signals are shifted by a half cycle and subjected to polarization, combination, light intensity is substantially fixed and has a plurality of polarization states, that is, is in a state close to non-polarized light. For this reason, in this embodiment, a polarization state changes. Consequently, it is possible to reduce a polarization dependency loss compared with when CW lights of different polarized waves, which do not cyclically change, are combined.

Note that, in this embodiment, the two intensity-modulated lights having the different polarization states are combined to generate dummy light. However, three or more intensity-modulated lights having different polarization states can be combined to generate dummy light. For example, an optical coupler divides CW light into four and inputs the divided CW lights to first to fourth four light-intensity modulating units. The first to fourth light-intensity modulating units perform the same intensity modulation as the intensity modulation of the light-intensity modulating unit 13 in this embodiment and delay intensity-modulated lights output from the third and fourth light-intensity modulating units by a half wavelength of the modulation cycle. Polarization states of intensity-modulated light output from the second light-intensity modulating unit and the intensity-modulated lights output from the third and fourth light-intensity modulating units and delayed can be respectively rotated with different rotation amounts.

Second Embodiment

Figure 12:
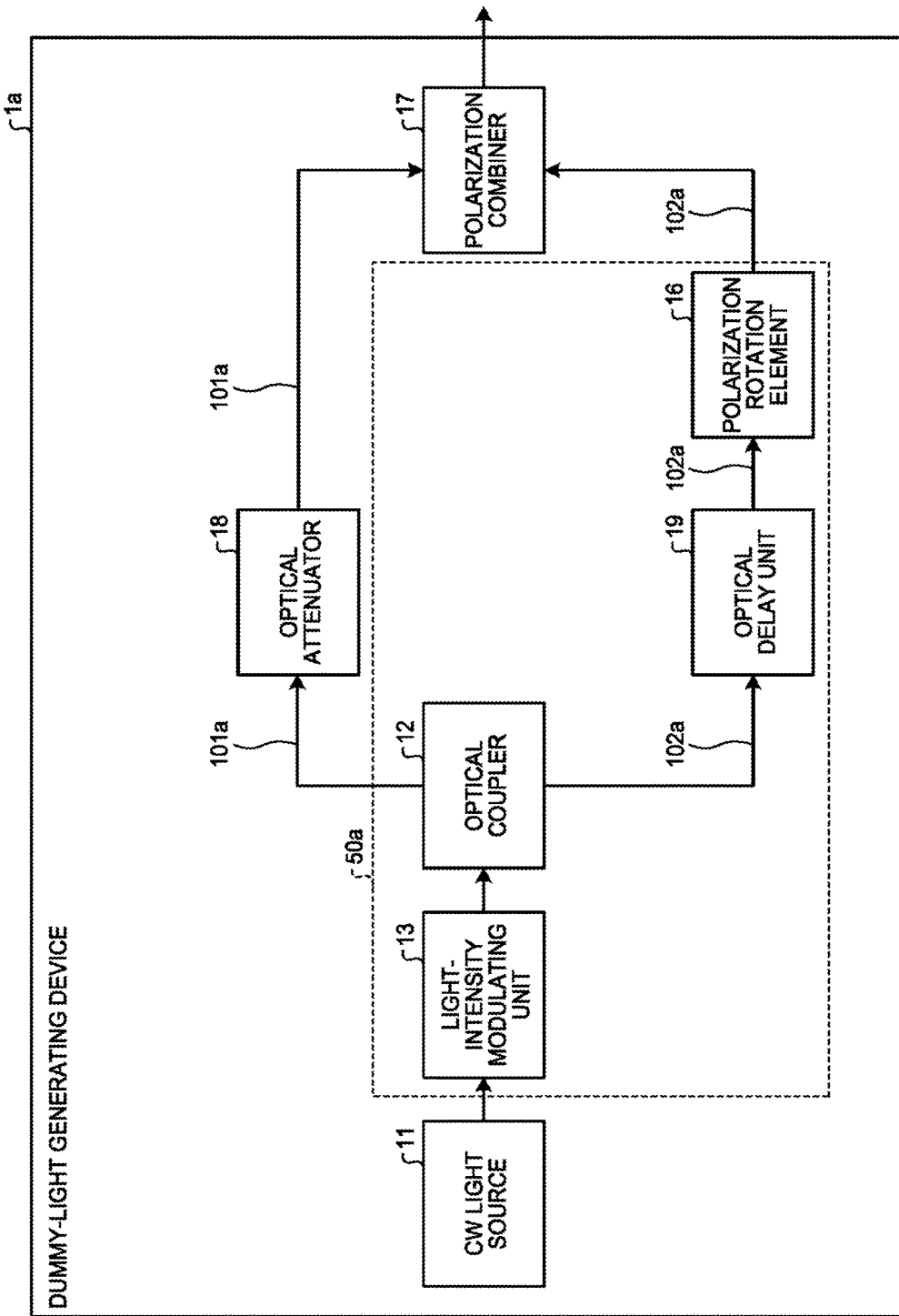
FIG. 12 is a diagram showing a configuration example of a dummy-light generating device according to a second embodiment.

FIG. 12 is a diagram showing a configuration example of a dummy-light generating device according to a second embodiment of the present invention. As shown in FIG. 12, a dummy-light generating device 1a in this embodiment is the same as the dummy-light generating device 1 in the first embodiment except that the light-intensity modulating unit 14 is deleted from the dummy-light generating device 1 in the first embodiment, an optical attenuator 18 is added, the optical delay unit 15 is changed to an optical delay unit 19, and a disposition position of the light-intensity modulating unit 13 is changed to a pre-stage of the optical coupler 12. Components having the same functions as the functions in the first embodiment are denoted by the same reference numerals and signs as the reference numerals and signs in the first embodiment and redundant explanation of the components is omitted.

In the first embodiment, the example is explained in which the dummy-light generating device includes the two light-intensity modulating units. In this embodiment, a dummy-light generating device including one light-intensity modulating unit is explained. In this embodiment, as shown in FIG. 12, the light-intensity modulating unit 13 is disposed between the light source 11 and the optical coupler 12. The operation of the light-intensity modulating unit 13 is the same as the operation in the first embodiment. That is, the light-intensity modulating unit 13 sets an inverse of a second frequency, which is a modulation frequency, as a modulation cycle and performs intensity modulation of CW light output from the CW light source 11 to generate intensity-modulated light. The optical coupler 12 divides the intensity-modulated light output from the light-intensity modulating unit 13 into two optical paths of a first optical path 101a and a second optical path 102a. That is, the optical coupler 12 divides the intensity-modulated light output from the light-intensity modulating unit 13 into first intensity-modulated light and third intensity-modulated light. Intensity-modulated light transmitted by the first optical path 101a, which is one of the intensity-modulated lights divided by the optical coupler 12, is input to the optical attenuator 18. The other intensity-modulated light, that is, intensity-modulated light transmitted by the second optical path 102a is input to the optical delay unit 19.

The optical attenuator 18 attenuates and outputs the light intensity of the input intensity-modulated light, that is, the first intensity-modulated light. The intensity-modulated light output from the optical attenuator 18 is input to the polarization combiner 17. As the optical attenuator 18, an optical attenuator having a fixed attenuation amount can be used or an optical attenuator having a variable attenuation amount can be used. When the optical attenuator having the fixed attenuation amount is used, light intensity between the intensity-modulated light transmitted by the first optical path 101a and the intensity-modulated light transmitted by the second optical path 102a is calculated in advance by measurement or the like. The optical attenuator having an attenuation amount for equalizing the intensities of both of the intensity-modulated lights is used. When the optical attenuator having the variable attenuation amount is used, light intensity between the intensity-modulated light transmitted by the first optical path 101a and the intensity-modulated light transmitted by the second optical path 102a is calculated by measurement or the like. An attenuation amount for equalizing the intensities of both of the intensity-modulated lights is set in the optical attenuator. As explained above, an attenuation amount can be dynamically changed using the optical attenuator having the variable attenuation amount. Note that, in the configuration example shown in FIG. 12, the optical attenuator is provided in the first optical path 101a. However, when the light intensity of the intensity-modulated light transmitted by the second optical path 102a is higher than the light intensity of the intensity-modulated light transmitted by the first optical path 101a, the optical attenuator is provided in the second optical path 102a.

Like the optical delay unit 15, the optical delay unit 19 delays the input intensity-modulated light by a half of the modulation cycle. That is, the optical delay unit 19 delays the third intensity-modulated light by a half time of the modulation cycle. As the optical delay unit 19, when the first optical path 101a and the second optical path 102a are formed by an optical fiber, for example, an additional optical fiber cable, the length of which is adjusted to delay the intensity-modulated light by a half of the modulation cycle, can be used. Alternatively, when the first optical path 101a and the second optical path 102a are optical paths formed on a substrate such as a quartz glass substrate, as the optical delay unit 19, an additional optical path formed on a substrate, the length of which is adjusted to delay the intensity-modulated light by a half of the modulation cycle, can be used.

As in the first embodiment, the polarization rotation element 16 in this embodiment rotates a polarization state of the input intensity-modulated light. That is, the polarization rotation element 16 in this embodiment rotates a polarization state of the third intensity-modulated light delayed by the optical delay unit 19 to generate the second intensity-modulated light.

The light-intensity modulating unit 13, the optical coupler 12, the optical delay unit 19, and the polarization rotation element 16 in this embodiment configure a modulated-light generating unit 50a that generates, using the CW light output from the CW light source 11, the first intensity-modulated light subjected to the intensity modulation and the second intensity-modulated light, which is delayed by a half time of the modulation cycle of the first intensity-modulated light with respect to the first intensity-modulated light and a polarization state of which is different from the polarization state of the first intensity-modulated light. The optical attenuator 18 can be included in the modulated-light generating unit 50a. In this embodiment, the first intensity-modulated light is intensity-modulated light input to the polarization combiner 17 via the first optical path 101a. The second intensity-modulated light is intensity-modulated light input to the polarization combiner 17 via the second optical path 102a.

In this embodiment as well, the intensity-modulated light input to the polarization combiner 17 via the second optical path 102a is a signal light opposite in phase to the intensity-modulated light input to the polarization combiner 17 via the first optical path 101a. Therefore, as in the example shown in FIG. 5 or FIG. 6 in the first embodiment, the amplitude of the light combined by the polarization combiner 17, that is, the dummy light is substantially fixed. As in the first embodiment, the polarization state of the intensity-modulated light input to the polarization combiner 17 via the second optical path 102a and the polarization state of the intensity-modulated light input to the polarization combiner 17 via the first optical path 101a are different from each other. For this reason, as in the first embodiment, the dummy-light generating device 1a in this embodiment can generate dummy light, which is not a single polarized wave and the light intensity of which is fixed. Consequently, it is possible to suppress deterioration in transmission quality of the signal light. Note that, the optical attenuator 18 is provided in the configuration example shown in FIG. 12. However, the optical attenuator 18 does not have to be provided, for example, when a difference between intensity-modulated light input to the polarization combiner 17 via the first optical path 101a and intensity-modulated light input to the polarization combiner 17 via the second optical path 102a in a state in which the optical attenuator 18 is not provided is a degree not affecting transmission quality.

Figure 13:
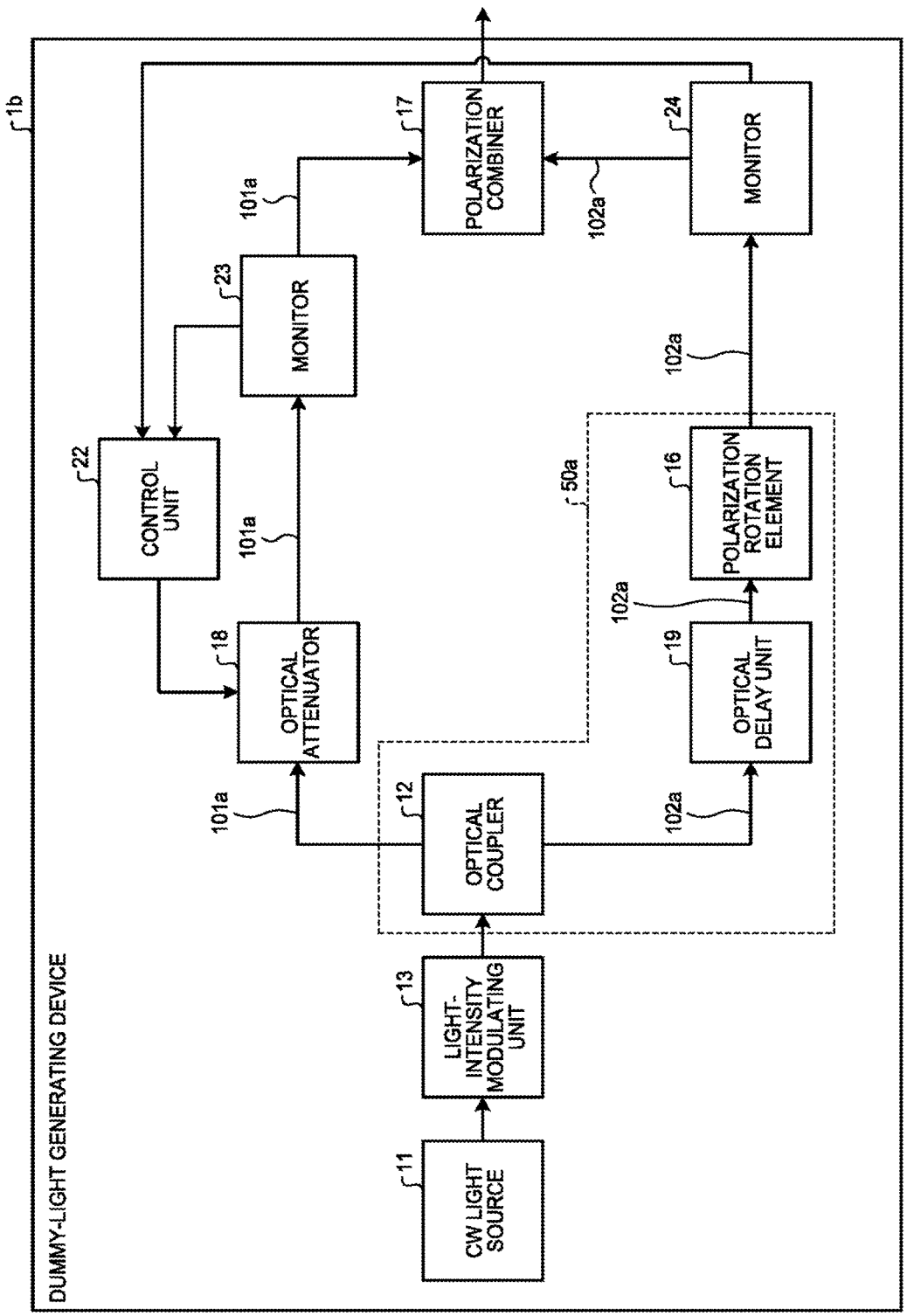
FIG. 13 is a diagram showing a configuration example of the dummy-light generating device in the second embodiment in the case in which an attenuation amount is set on the basis of a measurement result of light intensity.

A modification is explained. When the optical attenuator having the variable attenuation amount is used as the optical attenuator 18, it is also possible that light intensities of the intensity-modulated light input to the polarization combiner 17 via the first optical path 101a and the intensity-modulated light input to the polarization combiner 17 via the second optical path 102a are measured and an attenuation amount is set on the basis of a measurement result. FIG. 13 a diagram showing a configuration example of the dummy-light generating device in this embodiment in the case in which an attenuation amount is set on the basis of a measurement result of light intensity. A dummy-light generating device 1b shown in FIG. 13 is the same as the dummy-light generating device 1a shown in FIG. 12 except that a control unit 22 and monitors 23 and 24 are added to the dummy-light generating device 1a. The monitor 23 measures the light intensity of the intensity-modulated light input to the polarization combiner 17 via the first optical path 101a and outputs the light intensity to the control unit 22. The monitor 24 measures the light intensity of the intensity-modulated light input to the polarization combiner 17 via the second optical path 102a and outputs the light intensity to the control unit 22. As the monitors 23 and 24, for example, a photodiode can be used.

Figure 14:
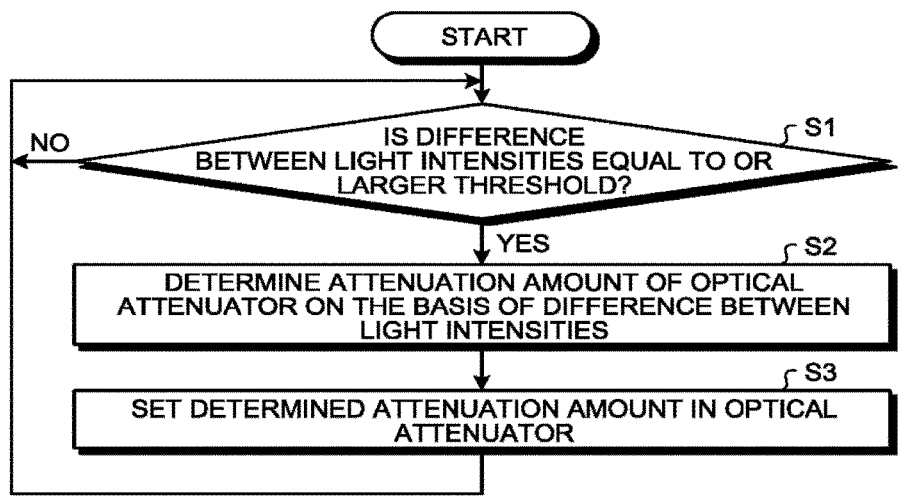
FIG. 14 is a flowchart showing an example of a control procedure in a control unit in the configuration example shown in FIG. 13 in the second embodiment.

The control unit 22 determines an attenuation amount on the basis of the light intensities input from the monitors 23 and 24 and sets the determined attenuation amount in the optical attenuator 18. FIG. 14 is a flowchart showing an example of a control procedure in the control unit 22. First, the control unit 22 determines whether a difference between the light intensities, that is, a difference between the light intensity input from the monitor 23 and the light intensity input from the monitor 24 is equal to or larger than a threshold (step S1). When the difference between the light intensities is smaller than the threshold (No at step S1), the control unit 22 repeats step S1. When the difference between the light intensities is equal to or larger than the threshold (Yes at step S1), the control unit 22 determines an attenuation amount of the optical attenuator 18 on the basis of the difference between the light intensities (step S2). Specifically, the control unit 22 determines the attenuation amount to eliminate the difference between the light intensities. Subsequently, the control unit 22 sets the determined attenuation amount in the optical attenuator 18 (step S3) and returns to step S1.

Figure 15:
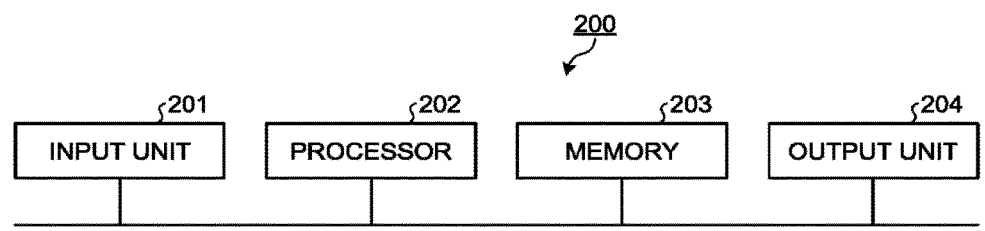
FIG. 15 is a diagram showing a configuration example of a control circuit in the second embodiment.

For example, the control unit 22 can be configured as hardware or can be configured by software. When the control unit 22 is realized by software, the control unit 22 is realized by, for example, a control circuit 200 shown in FIG. 15. As shown in FIG. 15, the control circuit 200 includes an input unit 201, which is a receiving unit that receives data input from the outside, a processor 202, a memory 203, and an output unit 204, which is a transmitting unit that transmits data to the outside. The input unit 201 is an interface circuit that receives data input from the outside of the control circuit 200 and gives the data to the processor 202. The output unit 204 is an interface circuit that transmits data received from the processor 202 or the memory 203 to the outside of the control circuit 200. When the control unit 22 is realized by the control circuit 200 shown in FIG. 15, the control unit 22 is realized by the processor 202 reading out and executing a program corresponding to processing carried out by the control unit 22 stored in the memory 203. The memory 203 is also used as a temporary memory in processing carried out by the processor 202.

Figure 16:
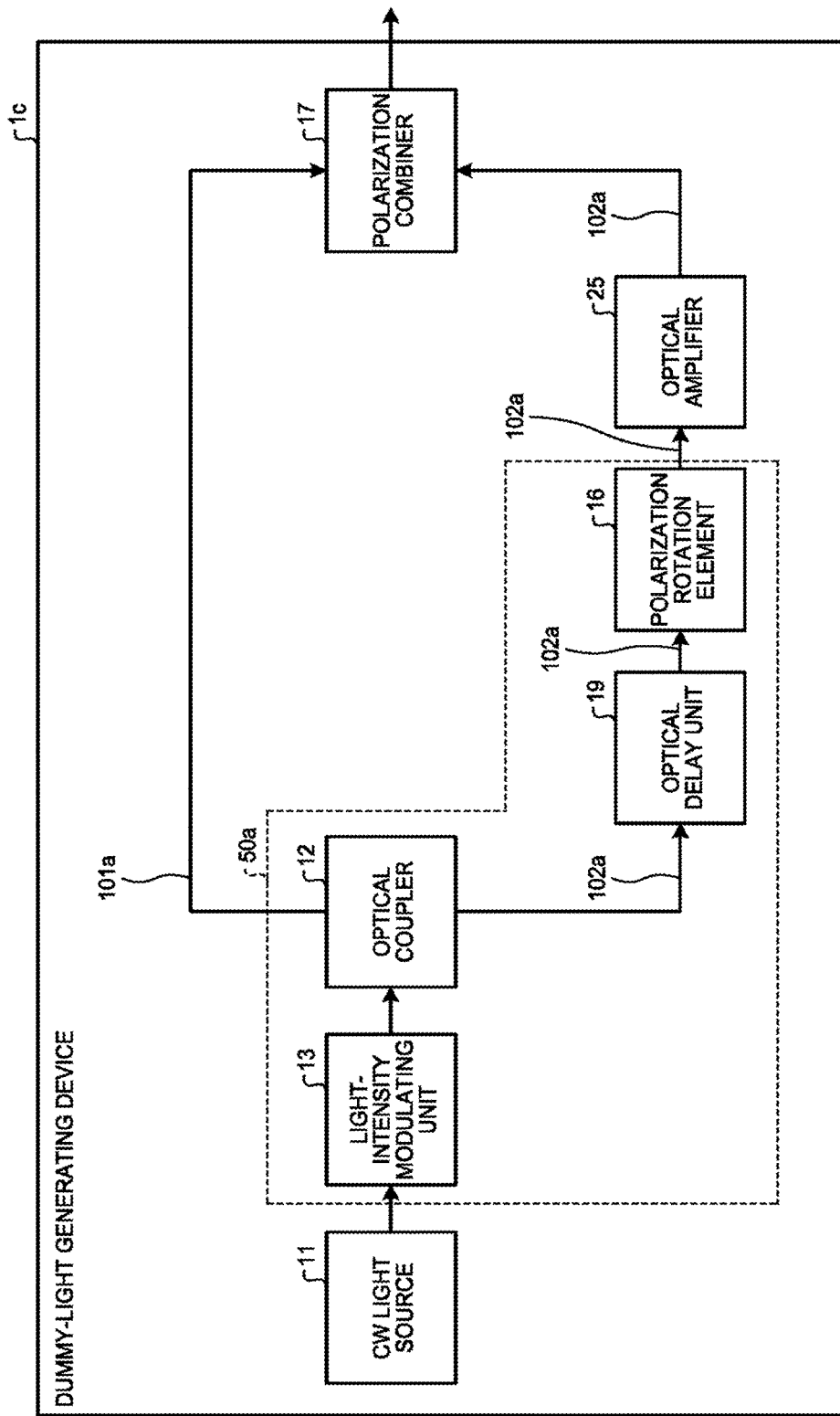
FIG. 16 is a diagram showing a configuration example of the dummy-light generating device in the second embodiment in the case in which an optical amplifier is used.

The example in which the optical attenuator is used is explained with reference to FIG. 12 and FIG. 13. However, an optical amplifier can be used instead of the optical attenuator. FIG. 16 is a diagram showing a configuration example of the dummy-light generating device in this embodiment in the case in which the optical amplifier is used. A dummy-light generating device 1c shown in FIG. 16 is the same as the dummy-light generating device 1a shown in FIG. 12 except that the optical attenuator 18 is deleted from the dummy-light generating device 1a and an optical amplifier 25 is added. An amplification rate in the optical amplifier 25 is set such that light intensities of the intensity-modulated light input to the polarization combiner 17 via the first optical path 101a and the intensity-modulated light input to the polarization combiner 17 via the second optical path 102a are equal. When the light intensity of the intensity-modulated light input to the polarization combiner 17 via the second optical path 102a is larger than the light intensity of the intensity-modulated light input to the polarization combiner 17 via the first optical path 101a, the optical amplifier can be provided in the first optical path 101a rather than the second optical path 102a.

Figure 17:
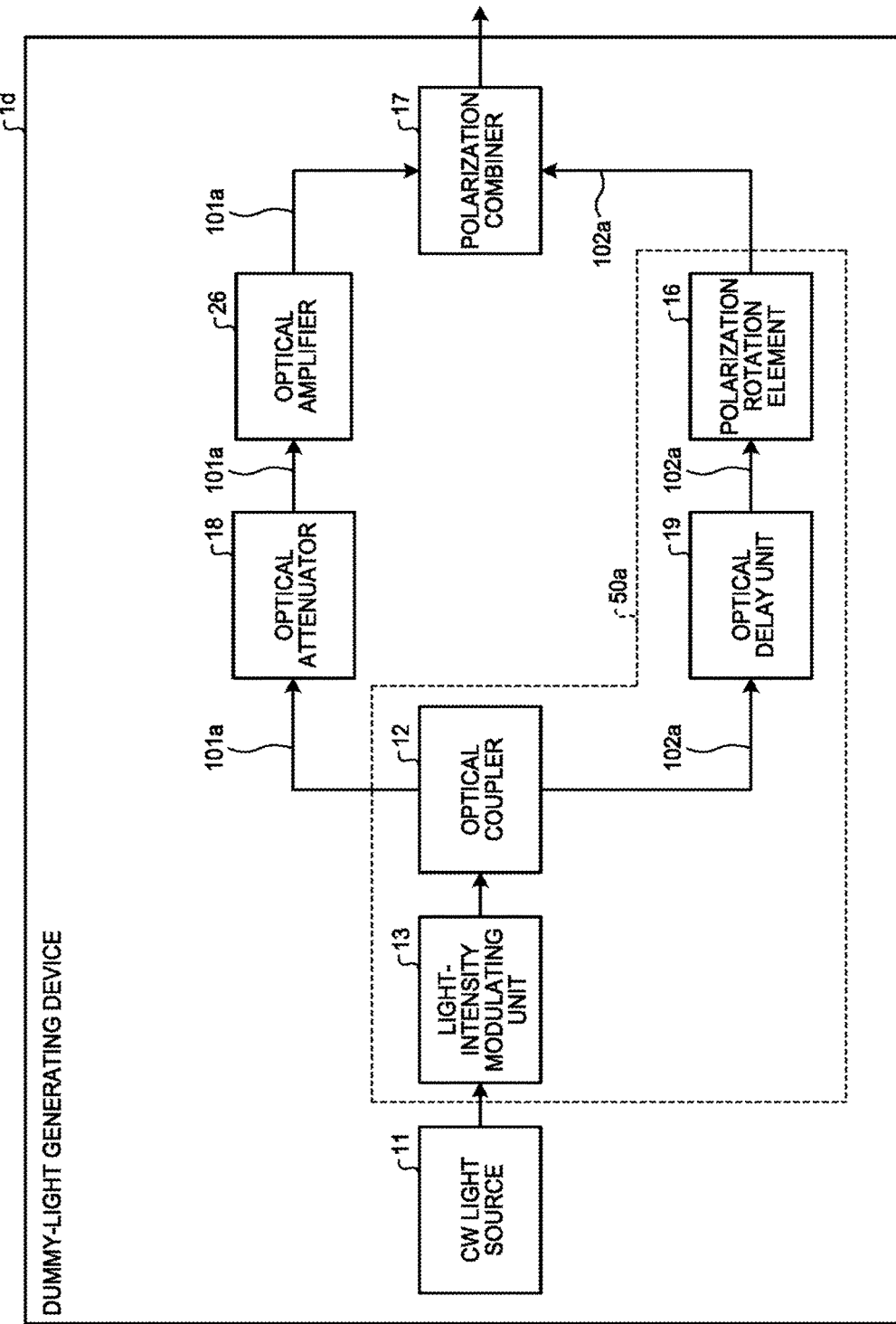
FIG. 17 is a diagram showing a configuration example of the dummy-light generating device in the second embodiment in the case in which an optical attenuator and the optical amplifier are used.

Both of the optical attenuator and the optical amplifier can be provided. FIG. 17 is a diagram showing a configuration example of the dummy-light generating device in this embodiment in the case in which the optical attenuator and the optical amplifier are used. A dummy-light generating device 1d shown in FIG. 17 is the same as the dummy-light generating device 1a shown in FIG. 12 except that an optical amplifier 26 is added to the dummy-light generating device 1a. An attenuation amount in the optical attenuator 18 and an amplification rate in the optical amplifier 26 are respectively set such that light intensities of the intensity-modulated light input to the polarization combiner 17 via the first optical path 101a and the intensity-modulated light input to the polarization combiner 17 via the second optical path 102a are equal. The same monitors 23 and 24 and the same control unit as the monitors 23 and 24 and the control unit 22 shown in FIG. 13 can be added to the dummy-light generating device 1d shown in FIG. 17. The control unit can determine the attenuation amount in the optical attenuator 18 and the amplification rate in the optical amplifier 26 such that light intensities input from the monitors 23 and 24 are equal. In this case, at step S3 of the flowchart shown in FIG. 14, the control unit determines the attenuation amount in the optical attenuator 18 and the amplification rate in the optical amplifier 26. However, the control unit carries out the same processing as the processing shown in FIG. 14 except step S3. For example, when the light intensity input from the monitor 23 is higher than the light intensity input from the monitor 24, the control unit sets the amplification rate of the optical amplifier 26 to 1, that is, does not perform amplification. The control unit sets the attenuation amount of the optical attenuator 18 to a value for equalizing the light intensity input from the monitor 23 and the light intensity input from the monitor 24. When the light intensity input from the monitor 23 is lower than the light intensity input from the monitor 24, the control unit sets the attenuation amount of the optical attenuator 18 to zero and sets the amplification rate of the optical amplifier 26 to a value for equalizing the light intensity input from the monitor 23 and the light intensity input from the monitor 24. Like the control unit 22 shown in FIG. 13, the control unit can be realized by hardware or can be realized by software. When the control unit is realized by software, the control unit is realized by, for example, the control circuit illustrated in FIG. 15.

Figure 18:
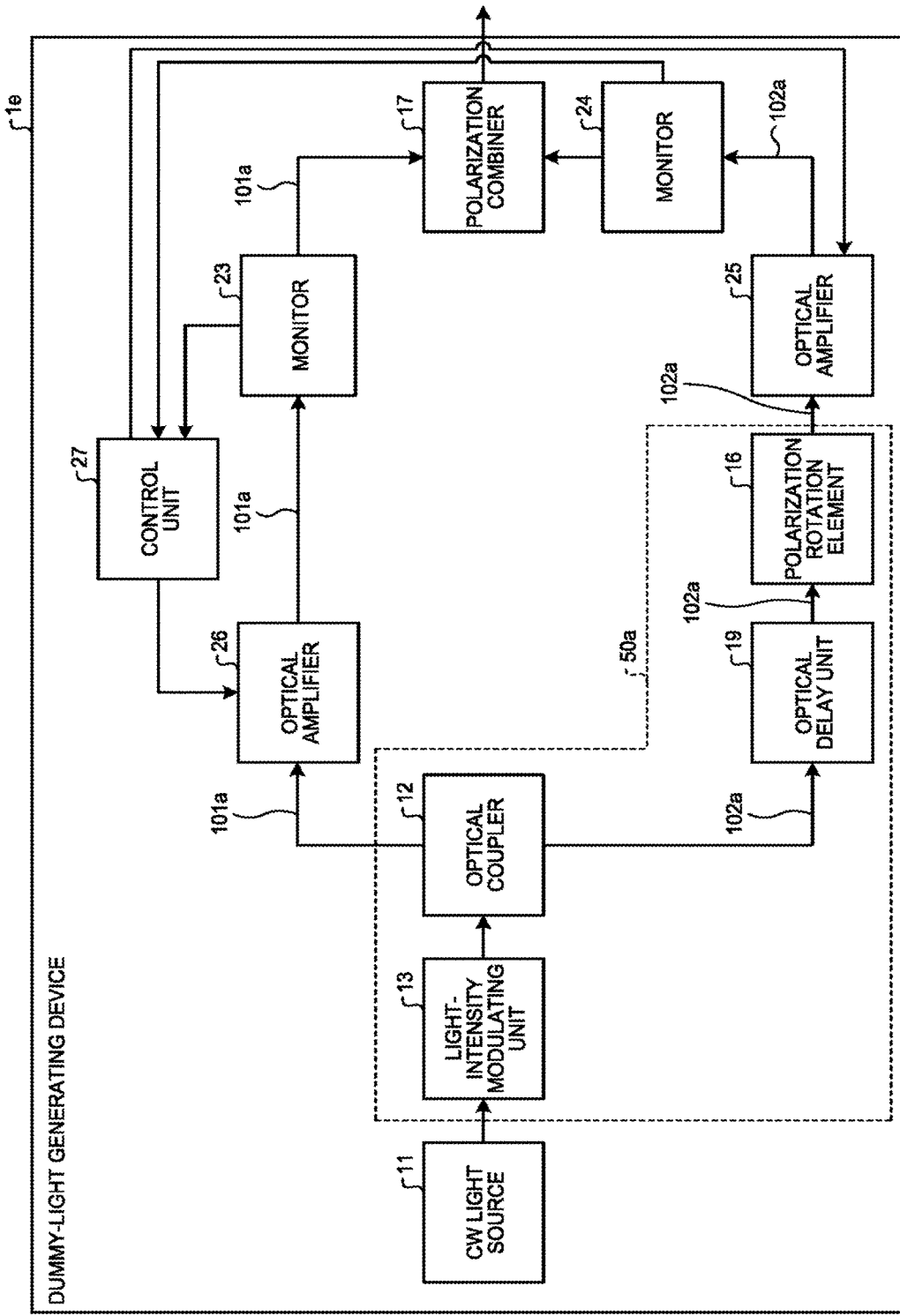
FIG. 18 is a diagram showing a configuration example of the dummy-light generating device in the second embodiment in the case in which optical amplifiers are provided in both of a first optical path and a second optical path.

Optical amplifiers can be provided in both of the first optical path 101a and the second optical path 102a. FIG. 18 is a diagram showing a configuration example of the dummy-light generating device in this embodiment in the case in which the optical amplifiers are provided in both of the first optical path 101a and the second optical path 102a. A dummy-light generating device 1e shown in FIG. 18 is the same as the dummy-light generating device 1c shown in FIG. 16 except that the monitors 23 and 24, a control unit 27, and the optical amplifier 26 are added to the dummy-light generating device 1c. The control unit 27 respectively sets an amplification rate in the optical amplifier 25 and an amplification rate in the optical amplifier 26 such that light intensities of the intensity-modulated light input to the polarization combiner 17 via the first optical path 101a and the intensity-modulated light input to the polarization combiner 17 via the second optical path 102a are equal.

At step S3 of the flowchart shown in FIG. 14, the control unit 27 determines the amplification rate in the optical amplifier 25 and the amplification rate in the optical amplifier 26. However, the control unit 27 carries out the same processing as the processing shown in FIG. 14 except step S3. For example, when the light intensity input from the monitor 23 is higher than the light intensity input from the monitor 24, the control unit 27 sets the amplification rate of the optical amplifier 26 to 1, that is, does not perform amplification. The control unit 27 sets the amplification rate of the optical amplifier 25 to a value equal to or larger than 1 for equalizing the light intensity input from the monitor 23 and the light intensity input from the monitor 24. When the light intensity input from the monitor 23 is lower than the light intensity input from the monitor 24, the control unit 27 sets the amplification rate of the optical amplifier 25 to 1, that is, does not perform amplification. The control unit 27 sets the amplification rate of the optical amplifier 26 to a value equal to or larger than 1 for equalizing the light intensity input from the monitor 23 and the light intensity input from the monitor 24. Like the control unit 22 shown in FIG. 13, the control unit 27 can be realized by hardware or can be realized by software. When the control unit 27 is realized by software, the control unit 27 is realized by, for example, the control circuit illustrated in FIG. 15. Similarly, optical attenuators can be provided in the two optical paths instead of the optical amplifier 25 and the optical amplifier 26. Attenuation amounts of the two optical attenuators can be determined on the basis of the light intensity input from the monitor 23 and the light intensity input from the monitor 24.

As explained above, in this embodiment, the intensity-modulated light modulated by the light-intensity modulating unit 13 is divided into two. One of the divided two intensity-modulated lights is delayed by a half of the modulation cycle to rotate the polarization state. Therefore, as in the first embodiment, it is possible to generate, using one light-intensity modulating unit, dummy light, which is not a single polarized wave and the light intensity of which is fixed. Consequently, it is possible to suppress deterioration in transmission quality of the signal light.

Third Embodiment

Figure 19:
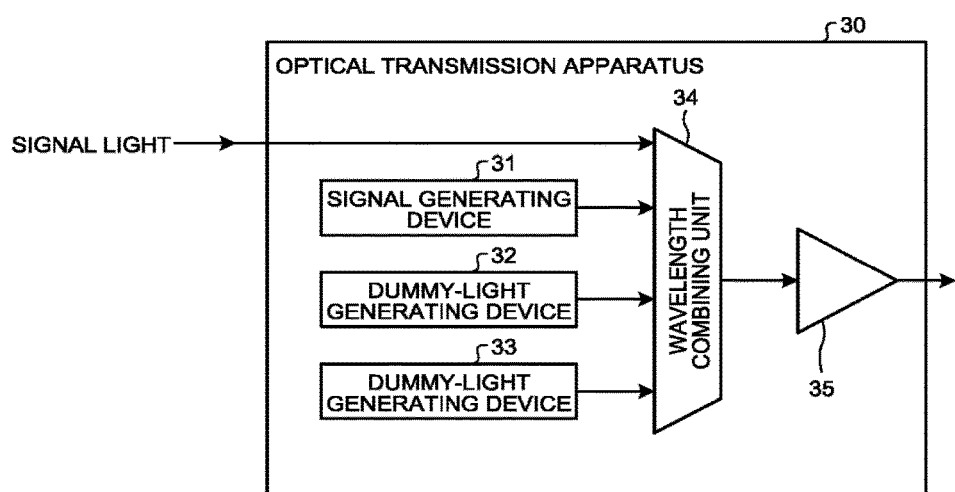
FIG. 19 is a diagram showing a configuration example of an optical transmission apparatus in a third embodiment.

FIG. 19 is a diagram showing a configuration example of an optical transmission apparatus in a third embodiment according to the present invention. An optical transmission apparatus 30 in this embodiment includes, as shown in FIG. 19, a signal generating device 31, dummy-light generating devices 32 and 33, a wavelength combining unit 34, and an optical amplifier 35.

Signal light is input to the optical transmission apparatus 30. The signal light input to the optical transmission apparatus 30 is signal light modulated using a modulation scheme such as DP-BPSK (Dual Polarization Binary Phase Shift Keying), DP-QPSK (Dual Polarization Quadrature Phase Shift Keying), or DP-16QAM (Dual Polarization 16 Quadrature Amplitude Modulation). The signal light input to the optical transmission apparatus 30 is a signal having a single wavelength in some case and is wavelength multiplexed light obtained by multiplexing signal lights having a plurality of wavelengths in other cases.

The signal generating device 31 generates modulated signal light by, for example, modulating a signal light according to the modulation scheme such as the DP-BPSK, DP-QPSK or the DP-16QAM.

The dummy-light generating devices 32 and 33 are the dummy-light generating device explained in the first embodiment of the second embodiment. The wavelength combining unit 34 combiners signal light input from the outside of the optical transmission apparatus 30, signal light generated by the signal generating device 31, and dummy lights generated by the dummy-light generating devices 32 and 33 to generate wavelength multiplexed light. The optical amplifier 35 amplifies and outputs the wavelength multiplexed light output from the wavelength combining unit 34.

Note that, in the configuration example shown in FIG. 19, the example is explained in which both of the signal light input from the outside of the optical transmission apparatus 30 and the signal light generated by the signal generating device 31 are present. However, a configuration can be adopted in which either one of the signal lights is input to the wavelength combining unit 34.

In the configuration example shown in FIG. 19, there are two dummy-light generating devices. However, the number of dummy-light generating devices included in the optical transmission apparatus 30 only has to be a number necessary for preventing an amplification characteristic of the optical amplifier 35 from being deteriorated, that is, for preventing a nonlinear optical effect from being caused in signal light by amplification. The number is not limited to the example shown in FIG. 19. For example, when a wavelength band amplified by the optical amplifier 35 is the first to fifth wavelength slots as shown in FIG. 4 and signal light in the second wavelength slot is absent, one dummy-light generating device is enough. When the wavelength band amplified by the optical amplifier 35 is the first to fifth wavelength slots and signal lights in the first and second wavelength slots are absent, the optical transmission apparatus 30 can include two dummy-light generating devices, that is, a dummy-light generating device that generates dummy light in the first wavelength slot and a dummy-light generating device that generates dummy light in the second wavelength slot or can include one dummy-light generating device that generates dummy light replacing the signal lights in both of the first wavelength slot and the second wavelength slot.

As explained above, the optical transmission apparatus 30 in this embodiment includes the dummy-light generating device explained in the first embodiment or the second embodiment and multiplexes, as signal light, dummy light generated by the dummy-light generating device and outputs the signal light. For this reason, it is possible to use dummy light, which is not a single polarized wave and the light intensity of which is fixed. It is possible to suppress deterioration in transmission quality of the signal light.

The configurations explained above in the embodiments indicate examples of the contents of the present invention. The configurations can be combined with other publicly-known technologies. A part of the configurations can be omitted or changed in a range not departing from the spirit of the present invention.

REFERENCE SIGNS LIST 1, 1a, 1b, 1c, 1d, 1e dummy-light generating device
11 CW light source
12 optical coupler
13, 14 light-intensity modulating unit
15, 19 optical delay unit
16 polarization rotation element
17 polarization combiner
18 optical attenuator
22, 27 control unit
23, 24 monitor
25, 26, 35 optical amplifier
30 optical transmission apparatus
31 signal generating device
32, 33 dummy-light generating device
34 wavelength combining unit
50 modulated-light generating unit
101, 101a first optical path
102, 102a second optical path
200 control circuit
201 input unit
202 processor
203 memory
204 output unit.

The invention claimed is:

1. A dummy-light generating device comprising:
a light emitter to output continuous light;
a modulated-light generator to generate, using the continuous light, first intensity-modulated light subjected to intensity modulation and second intensity-modulated light delayed by a half time of a modulation cycle of the first intensity-modulated light with respect to the first intensity-modulated light and having a polarization state different from a polarization state of the first intensity-modulated light, the modulated-light generator delaying the second intensity-modulated light being delayed by the half time of the modulation cycle of the first intensity-modulated light based on a difference in drive voltage signals for modulation of the first intensity-modulated light and the second intensity-modulated light; and
a polarization combiner to perform polarization combination of the first intensity-modulated light and second intensity-modulated light and output light after the polarization combination as continuous dummy light.

2. The dummy-light generating device according to claim 1, wherein the modulated-light generator includes: an optical coupler to divide the continuous light into first continuous light and second continuous light; a first intensity modulator to perform intensity modulation of the first continuous light to generate the first intensity-modulated light based on one of the voltage drive signals; a second intensity modulator to perform intensity modulation of the second continuous light and to delay the second continuous light based on another of the voltage drive signals to generate intensity-modulated light delayed by the half time of the modulation cycle of the first intensity-modulated light.

3. The dummy-light generating device according to claim 2, wherein the modulated-light generator includes:
driving circuitry to generated the drive voltage signals at different times generate a delay of the half time of the modulation cycle of the first intensity-modulated light.

4. The dummy-light generating device according to claim 3, wherein the modulated-light generator further includes an optical attenuator to attenuate and output light intensity of the first intensity-modulated light.

5. The dummy-light generating device according to claim 1, wherein light intensity of the continuous dummy light is fixed.

6. The dummy-light generating device according to claim 1, wherein a modulation frequency, which is an inverse of the modulation cycle of the first intensity-modulated light, is a frequency higher than a half of a band width of a spectrum of the continuous light centering on a frequency corresponding to a center frequency of the continuous light.

7. The dummy-light generating device according to claim 1, wherein, when the dummy light is subjected to wavelength multiplexing with signal light, a modulation frequency, which is an inverse of the modulation cycle of the first intensity-modulated light, is a frequency lower than a symbol rate of the signal light.

8. The dummy-light generating device according to claim 1, wherein a spectrum of the dummy light has a first peak in a frequency corresponding to a center wavelength of the continuous light and has two second peaks in a frequency higher than a frequency corresponding to the center wavelength of the continuous light by a modulation frequency, which is an inverse of the modulation cycle of the first intensity-modulated light, and a frequency lower than the frequency corresponding to the center wavelength of the continuous light by the modulation frequency.

9. An optical transmission apparatus comprising:
the dummy-light generator according to claim 1;
a wavelength combiner to combine dummy light output from the dummy-light generator and signal light to generate wavelength multiplexed light; and
an optical amplifier to amplify the wavelength multiplexed light.

10. A dummy-light generating method comprising:
generating first intensity-modulated light subjected to light intensity modulation and second intensity-modulated light delayed by a half time of a modulation cycle of the first intensity-modulated light with respect to the first intensity-modulated light and having a polarization state different from a polarization state of the first intensity-modulated light, the second intensity-modulated light being delayed by the half time of the modulation cycle of the first intensity-modulated light based on a difference in drive voltage signals for modulation of the first intensity-modulated light and the second intensity-modulated light; and performing polarization combination of the first intensity-modulated light and second intensity-modulated light and outputting light after the polarization combination as continuous dummy light.

* * * * *